(12) United States Patent
Fegesch et al.

(10) Patent No.: US 6,438,753 B1
(45) Date of Patent: Aug. 20, 2002

(54) ARRANGEMENT FOR TV BROADCASTING OUTDOOR EVENTS OR THE LIKE

(75) Inventors: Hendrik Fegesch, Darmstadt; Jörg Tschierschky, Mainz; Wilfried Wüst, Fischbachtal, all of (DE)

(73) Assignee: BTS Holding International B.V. (NL)

( * ) Notice: Subject to any disclaimer, the term of this patent is extended or adjusted under 35 U.S.C. 154(b) by 0 days.

(21) Appl. No.: 08/951,038

(22) Filed: Oct. 15, 1997

(30) Foreign Application Priority Data

Oct. 23, 1996 (DE) .......................... 196 43 734

(51) Int. Cl.[7] .......................... H04N 7/16; H04N 5/222; H04N 5/38
(52) U.S. Cl. .................. 725/143; 725/149; 348/722; 348/723
(58) Field of Search .................. 348/722, 723, 348/6, 12, 13, 825; 455/3.1, 5.1, 6.1; 359/146; H04N 7/10, 7/14, 5/222, 5/38

(56) References Cited

U.S. PATENT DOCUMENTS

| | | | | |
|---|---|---|---|---|
| 5,363,433 A | * | 11/1994 | Isono | 379/92 |
| 5,371,535 A | * | 12/1994 | Takizawa | 348/722 |
| 5,486,877 A | | 1/1996 | Tanaka | 348/722 |
| 5,508,737 A | * | 4/1996 | Lang | 348/157 |
| 5,671,010 A | * | 9/1997 | Shimbo et al. | 348/157 |
| 5,821,995 A | * | 10/1998 | Nisikawa | 348/722 |
| 5,847,753 A | * | 12/1998 | Gabello et al. | 348/88 |
| 5,854,654 A | * | 12/1998 | Zwahlen et al. | 348/722 |
| 5,912,700 A | * | 6/1999 | Honey et al. | 348/157 |

OTHER PUBLICATIONS

Romero et al., "HDTV Coverage of the Barcelona Olympic Games", EBU Review—Technical, Nr. 254, 1992.

\* cited by examiner

*Primary Examiner*—Andrew Faile
*Assistant Examiner*—Virek Srivastava
(74) *Attorney, Agent, or Firm*—Gregory L. Thorne

(57) ABSTRACT

An arrangement for TV broadcasting outdoor events or the like via a mobile unit (34), which is connected via cables (30, 11, 20) to devices (12, 21, 22) for supplying and/or receiving video, audio or control signals and accommodates corresponding apparatuses (34a) for processing these signals, achieves a reduction in the number of cables and realizes new services, by providing at least one coupling station (10) in which separate optical waveguides (11, 20), outgoing from the individual devices (12, 21, 22), are coupled to a light-wave broadband cable (30), the light-wave broadband cable (30) being connected to a docking station (31) for transferring source signals, the devices (12, 21, 22) and the docking station (31) having electro-optical transducer elements (32) for converting the source signals, and the docking station being connectable to the mobile unit (34).

6 Claims, 3 Drawing Sheets

ARRANGEMENT FOR TV BROADCASTING OUTDOOR EVENTS OR THE LIKE

BACKGROUND OF THE INVENTION

1. Field of the Invention

The invention relates to an arrangement for TV broadcasting outdoor events or the like by means of a mobile unit which is connected via cables to devices for supplying and/or receiving video, audio or control signals and accommodates corresponding apparatuses for processing these signals.

2. Description of the Related Art

Such arrangements with TV mobile units are known. These compact and mobile technical units are used for recorded or live broadcasts of television productions. Such mobile units are used for, for example, TV broadcasts of outdoor sports and program events. They are equipped with television cameras, microphones, recording/reproducing apparatuses and numerous television and sound control devices. The video, audio and control signals are transmitted through several screened cables which are often several hundred meters long, for example triax cables, so as to connect remote television cameras with the apparatuses installed in the mobile unit. The heavy cables wound on large cable reels during mobile unit rides occupy a relatively large area of the useful space in the mobile unit.

Television productions for broadcasting sports and program events require an increasing number of technical means. In addition to the actual TV broadcasting tasks, the mobile unit must service further peripheral areas with source signals for commentator positions, organization management, spectator areas, etc. This requires an extra displacement of cable paths.

Moreover, it should be noted that with an increasing use of digital video and audio techniques, the conventional broadcasting technique, in the form of copper cables, is not suitable for complying with the new requirements.

The state of the art for cabled audiovisual broadcasting techniques is described in U.S. Pat. No. 5,486,877.

SUMMARY OF THE INVENTION

It is an object of the invention to reduce the number of cables for broadcasting outdoor events, realize new services and provide a basic system for future requirements and techniques.

According to the invention, in an arrangement of the type described in the opening paragraph, this object is solved in that

- at least one coupling station is provided in which separate optical waveguides outgoing from the individual devices are coupled to a light-wave broadband cable,
- the light-wave broadband cable is connected to a docking station for transferring source signals,
- the devices and the docking station comprise electro-optical transducer elements for converting the source signals, and
- the docking station is connectable to the mobile unit.

Such a construction has the advantage that, as compared with the prior art, the cables of the individual devices and signal sources no longer need to be star-connected to the mobile unit over large distances. Instead, the separate optical waveguides outgoing from the individual devices lead to a coupling station at a spatially optimum location where they are connected to the single light-wave broadband cable outgoing from the coupling station. At least a part of the overall cable paths can then be bridged by a single broadband cable. Consequently, the number of cables is reduced considerably and the space occupied by the cables in the mobile unit can be reduced in favor of the control rooms. Dependent on the circumstances, single cameras can be connected, as usual, to the mobile unit via the triax cable connections which are considered to be robust. An essential advantage of the invention thus consists of a concentration of the signal paths via light-wave cables.

Whereas a purely optical signal distribution is performed in the coupling station, the source signals are converted by means of the electro-optical transducer elements in the docking station in which the light-wave broadband cable terminates, and in said devices. The conversion of the source signals is required for the processing operations in the mobile unit and for transfer into the light-wave network. The docking station is an independent unit and provides the possibility of installing the light-wave network independently of the mobile unit. The light-wave network can thus be prepared and installed in such a way that, upon arrival of the mobile unit, only a connection with the docking station is to be established so as to realize full operability.

According to the invention, this docking station may be connected to one or more mobile units or, for example, to an external transfer point for a telecommunication device. The local operating time of the mobile unit and services (time, wages) can thus be reduced by using such a docking station. Moreover, this leads to a greater flexibility.

A further embodiment of the invention is characterized by a second coupling station which is connected, at the input, to at least one further sub-control unit via separate optical waveguides and, at the output, to the first coupling station via a light-wave broadband cable. This provides the simple possibility of integrating one or more control units. Such control units may be, for example, either a control unit for sound and illumination, or a control unit for picture information.

A further embodiment of the invention is characterized in that an ATM (Asynchronous Transfer Mode) transfer path connected to a data bank in the broadcasting center is provided parallel to the broadcasting path. This provides an additional service possibility for, for example commentators who then have direct access via the light-wave network to the data stored in the data bank.

These and other aspects of the invention are apparent from and will be elucidated with reference to the embodiments described hereinafter.

DESCRIPTION OF THE PREFERRED EMBODIMENTS

Figure 1:
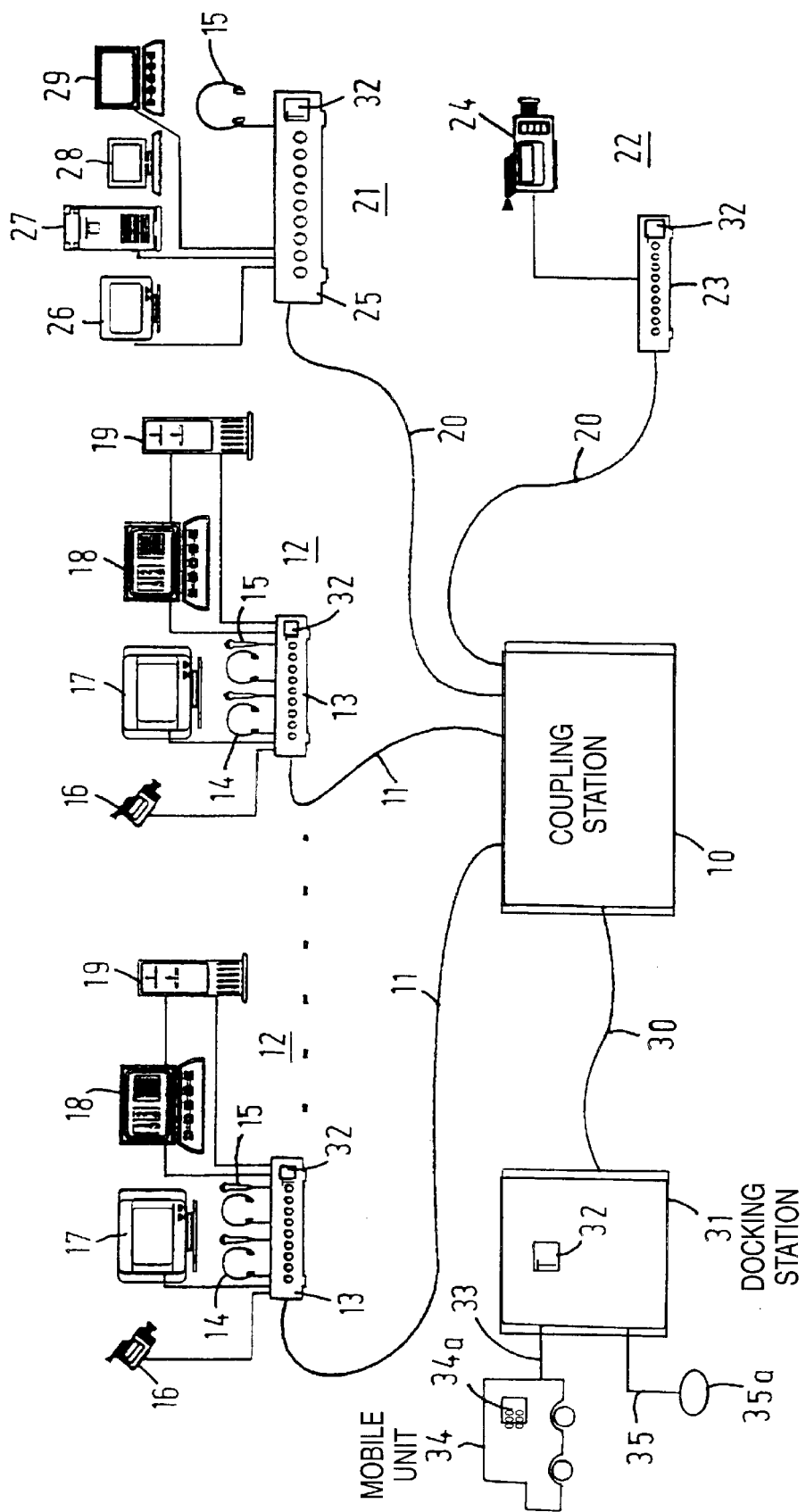
FIG. 1 shows an outdoor broadcasting network having a plurality of commentator positions, a graphic-display and time-recording unit, and a camera unit.

In FIG. 1, the network comprises a central coupling station 10 which is connected to eight commentator positions 12 via separate optical waveguides 11. In this embodiment, each commentator position 12 comprises a group of apparatuses 13 including headphones 14 and microphones 15, a camera 16, a picture monitor 17, a data monitor 18 and a video server station 19. The coupling station 10 is further connected via optical waveguides 20 to a graphic-display and time-recording unit 21 and a camera unit 22, comprising a unit 23 of apparatuses and a stand-alone camera 24. In this embodiment, the graphic-display and time-recording unit 21 comprises a unit 25 of apparatuses with a headphone 15, a picture monitor 26, an electronic unit 27, an info monitor 28 and a data monitor 29.

The optical waveguides 11, 20 outgoing from the separate devices, i.e., from the commentator positions 12, the graphic-display and time-recording unit 21 and the camera unit 22 are coupled in the coupling station 10 to a light-wave broadband cable 30 leading from the coupling station 10 to a docking station 31. The docking station 31 and the groups of apparatuses 13, 25, 23 of the devices 12, 21, 22 comprise electro-optical transducer elements 32 for converting source signals conveyed through the optical waveguides. The docking station 31 is connected via a first output 33 to a mobile unit 34 comprising apparatuses 34a and may also be connected to an external transfer point 35a via a further output 35. The conversion of the source signals in the docking station 31 is necessary for the processing operations in the mobile unit 34 and for their transfer into the waveguide network.

Figure 2:
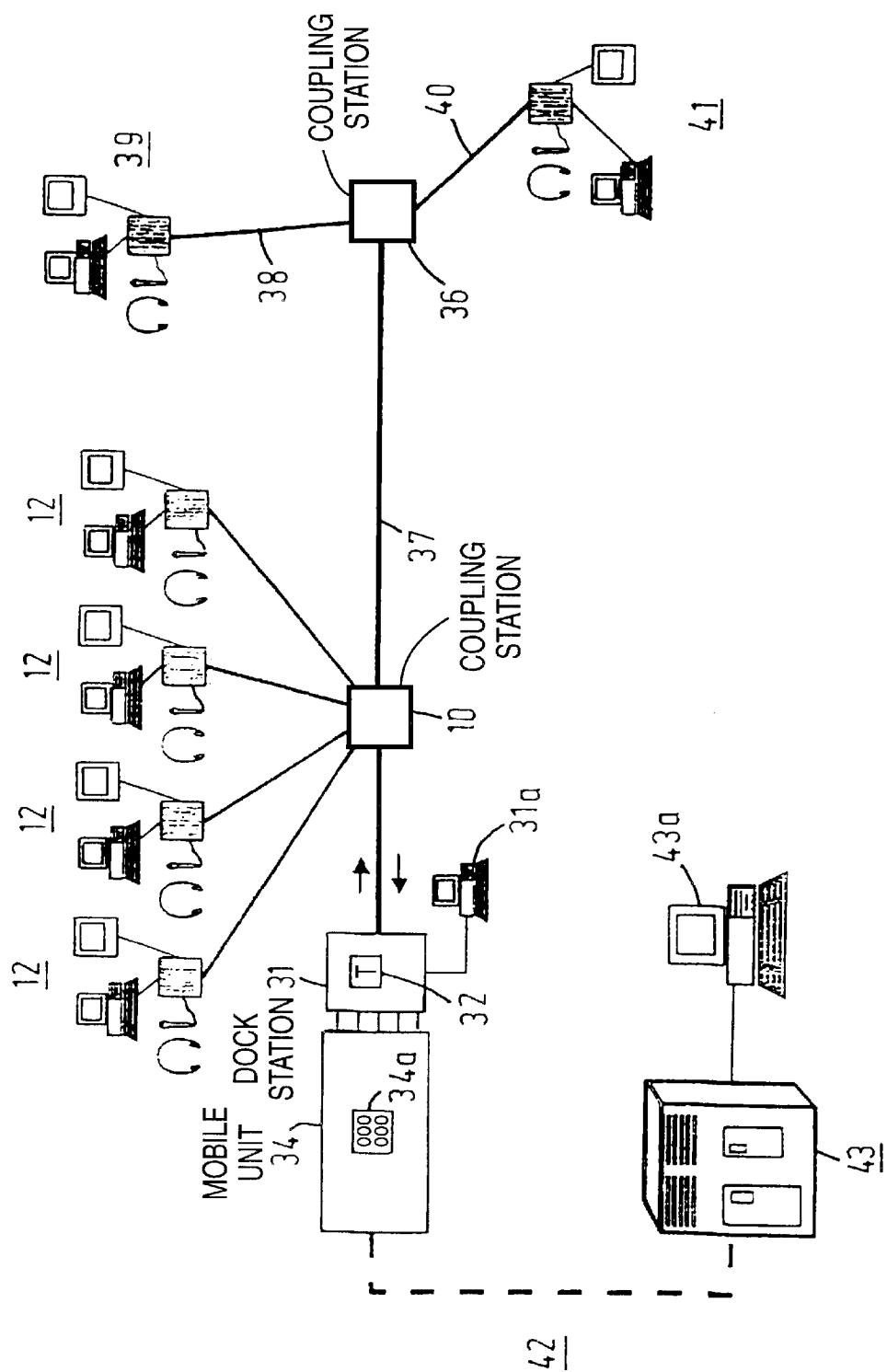
FIG. 2 shows an outdoor broadcasting network also having a plurality of commentator positions, with two sub-control units and additional possibilities for services to commentators.

FIG. 2 shows an embodiment, similar to FIG. 1, with a coupling station 10 and four connected commentator positions 12, and an additional coupling station 36 which is connected to the first coupling station 10 via a light-wave broadband cable 37. In this case, the additional coupling station 36 is connected to a sound and illumination sub-control unit 39 via an optical waveguide 38 and to a picture information sub-control unit 41 via an optical waveguide 40. In addition to this simple integration of sub-control units arranged for large productions, additional services may be presented to the commentator positions 12 via the waveguide network, namely parallel to the broadcasting path via an ATM transfer path 42 (Asynchronous Transfer Mode). This transfer path is constituted by a connection between the mobile unit 34 and a broadcasting center 43. This provides, for example, possibilities of access to data banks in the broadcasting center. A PC 31a elucidates a possible configuration of the signal paths and a PC 43a used as a server in the broadcasting center elucidates the possibilities of access to a local server.

Figure 3:
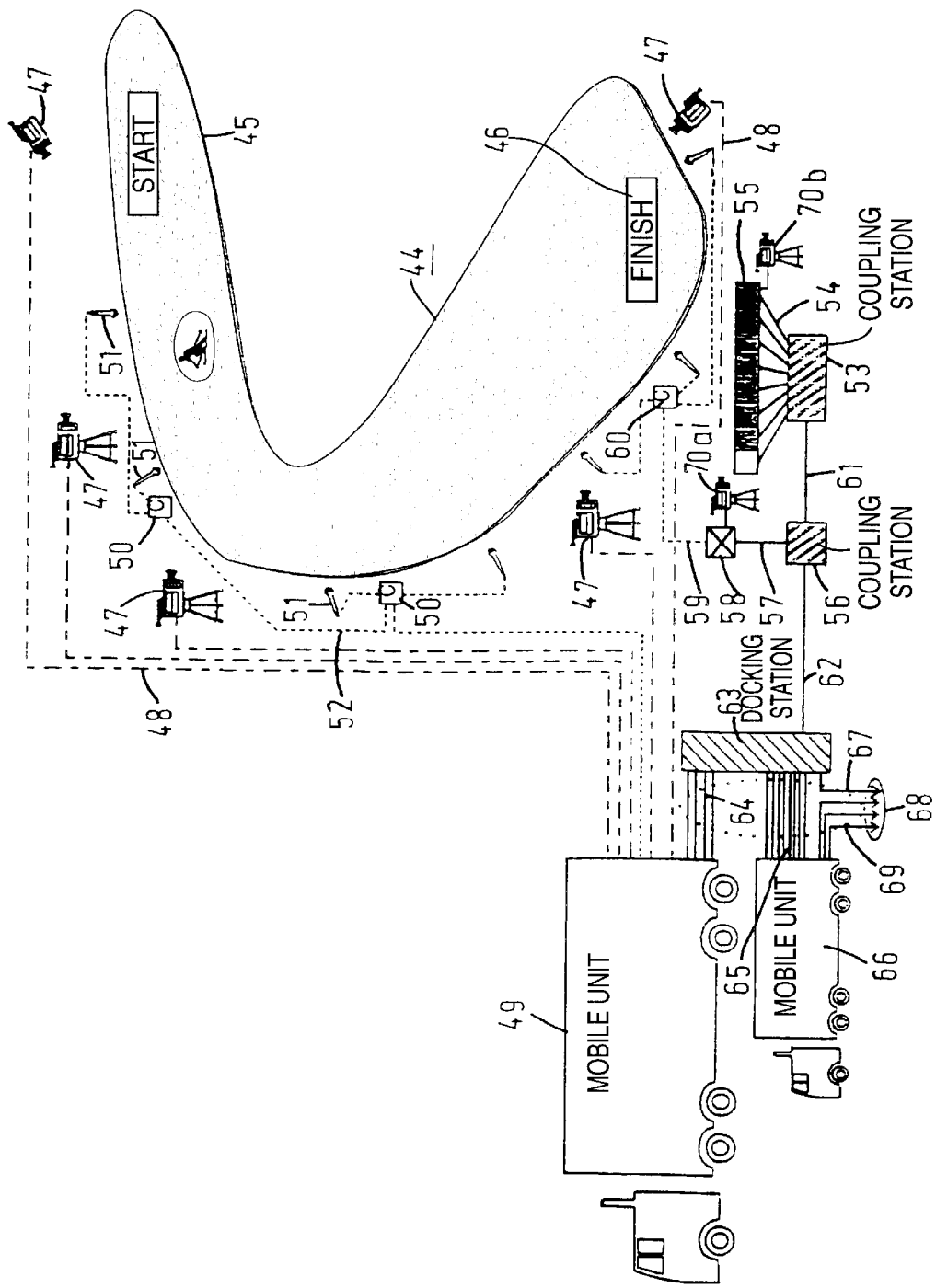
FIG. 3 shows an outdoor network for broadcasting, for example, a downhill ski event.

FIG. 3 shows how the number of cable connections between the mobile unit, the time-recording devices and the commentator positions can be reduced by means of the invention in a downhill ski event. The reference numeral 44 denotes a ski slope, with a start at the position 45 and a finish at the position 46. Cameras 47, which are directly connected in known manner to a mobile unit 49 via triax cables 48, are positioned along the ski slope. Moreover, two connection boxes 50 with microphones 51 are positioned in the uphill region of the ski slope and are also connected in known manner to the mobile unit 49 via audio cables 52.

According to the invention, a first coupling station 53 connected to commentator positions 55 via optical waveguides 54, is located at a spatially favorable site. A further coupling station 56 is connected via an optical waveguide 57 to a graphic-display and time-recording unit 58 which in turn is connected via audio cables 59 to a connection box 60 for the microphones arranged in the downhill region of the ski slope. The coupling station 53 is connected via a light-wave broadband cable 61 to the coupling station 56 which in turn is connected to a docking station 63 via a light-wave broadband cable 62. Similarly, as in the examples described above, a purely optical signal distribution takes place in the coupling stations, while the source signals are converted by means of electro-optical transducer elements in the docking station 63. In this embodiment, the docking station 63 is connected to the mobile unit 49 via cables 64, a Eurovision mobile unit 66 via cables 65 and a transfer point 68 via cables 67, which transfer point is connected to the Eurovision mobile unit 66 also via cables 69. In the embodiment shown, there are two stand-alone cameras 70a,b which supply their signals to the waveguide network. The stand-alone camera 70a is connected via transducer elements in the graphic-display and time-recording unit 58. As can be seen in the Figure, the use of such a waveguide network considerably reduces the number of cables between the mobile units 49, 66, the time-recording unit 58 and the commentator positions 55. New services and processing possibilities can be offered with the equipment provided for the commentator positions 55 without the necessity of installing further cable paths.

What is claimed is:

1. An arrangement for TV broadcasting outdoor events by means of a mobile unit connected via cables to devices for supplying and/or receiving video, audio or control signals, said mobile unit accommodating corresponding apparatuses for processing these signals, characterized in that said devices comprise electro-optical transducer elements for converting source signals into outgoing optical signals, and said arrangement comprises:

separate optical waveguides coupled, respectively, to the devices for carrying the outgoing optical signals from said devices;

at least one coupling station coupled to the separate optical waveguides, and to a light-wave broadband cable for receiving and carrying the outgoing optical signals from each of the separate optical waveguides simultaneously;

a docking station coupled to the light-wave broadband cable for receiving the outgoing optical signals, said docking station comprising an electro-optical transducer element for converting the outgoing optical signals back into source signals, said docking station being connectable to the mobile unit for conveying the source signals; and a second coupling station having an input connected to at least one further sub-control unit via separate optical waveguides and an output connected to the first coupling station via a light-wave broadband cable.

2. An arrangement for TV broadcasting outdoor events by means of a mobile unit connected via cables to devices for supplying and/or receiving video, audio or control signals, said mobile unit accommodating corresponding apparatuses for processing these signals, characterized in that said devices comprise electro-optical transducer elements for converting source signals into outgoing optical signals, and said arrangement comprises:

separate optical waveguides coupled, respectively, to the devices for carrying the outgoing optical signals from said devices;

at least one coupling station coupled to the separate optical waveguides, and to a light-wave broadband cable for receiving and carrying the outgoing optical signals from each of the separate optical waveguides simultaneously;

a docking station coupled to the light-wave broadband cable for receiving the outgoing optical signals, said docking station comprising an electro-optical transducer element for converting the outgoing optical signals back into source signals, said docking station being connectable to the mobile unit for conveying the source signals; and an ATM (Asynchronous Transfer Mode) transfer path connected to a data bank in a broadcasting center, said ATM transfer path being parallel to the broadcasting path formed by the optical waveguides and the light-wave broadband cable.

3. An arrangement for TV broadcasting outdoor events by means of a mobile unit connected via cables to devices for supplying and/or receiving video, audio or control signals, said mobile unit accommodating corresponding apparatuses for processing these signals, characterized in that said devices comprise electro-optical transducer elements for converting source signals into outgoing optical signals, and said arrangement comprises:

separate optical waveguides coupled, respectively, to the devices for carrying the outgoing optical signals from said devices;

at least one coupling station coupled to the separate optical waveguides, and to a light-wave broadband cable for receiving and carrying the outgoing optical signals from each of the separate optical waveguides simultaneously;

a docking station coupled to the light-wave broadband cable for receiving the outgoing optical signals, said docking station comprising an electro-optical transducer element for converting the outgoing optical signals back into source signals, said docking station being connectable to the mobile unit for conveying the source signals, said docking station being connected to at least one mobile unit and/or at least one external transfer point; and a second coupling station having an input connected to at least one further sub-control unit via separate optical waveguides and an output connected to the first coupling station via a light-wave broadband cable.

4. An arrangement for TV broadcasting outdoor events by means of a mobile unit connected via cables to devices for supplying and/or receiving video, audio or control signals, said mobile unit accommodating corresponding apparatuses for processing these signals, characterized in that said devices comprise electro-optical transducer elements for converting source signals into outgoing optical signals, and said arrangement comprises:

separate optical waveguides coupled, respectively, to the devices for carrying the outgoing optical signals from said devices;

at least one coupling station coupled to the separate optical waveguides, and to a light-wave broadband cable for receiving and carrying the outgoing optical signals from each of the separate optical waveguides simultaneously;

a docking station coupled to the light-wave broadband cable for receiving the outgoing optical signals, said docking station comprising an electro-optical transducer element for converting the outgoing optical signals back into source signals, said docking station being connectable to the mobile unit for conveying the source signals, said docking station being connected to at least one mobile unit and/or at least one external transfer point; and an ATM (Asynchronous Transfer Mode) transfer path connected to a data bank in a broadcasting center, said ATM transfer path being parallel to the broadcasting path formed by the optical waveguides and the light-wave broadband cable.

5. An arrangement as claimed in claim 1, characterized in that said arrangement further comprises an ATM (Asynchronous Transfer Mode) transfer path connected to a data bank in a broadcasting center, said ATM transfer path being parallel to the broadcasting path formed by the optical waveguides and the light-wave broadband cable.

6. An arrangement as claimed in claim 3, characterized in that said arrangement further comprises an ATM (Asynchronous Transfer Mode) transfer path connected to a data bank in a broadcasting center, said ATM transfer path being parallel to the broadcasting path formed by the optical waveguides and the light-wave broadband cable.

* * * * *